US009953424B2

(12) United States Patent
Simón Vilar

(10) Patent No.: US 9,953,424 B2
(45) Date of Patent: Apr. 24, 2018

(54) METHOD AND SYSTEM FOR DETERMINING WHETHER A SPHERICAL ELEMENT IMPACTS WITH A COMPONENT OF A PLAYING FIELD, OR ARRANGED ON OR PROXIMATE THERETO

(71) Applicant: FOXTENN BGREEN, S. L., Barcelona (ES)

(72) Inventor: Javier Simón Vilar, Barcelona (ES)

(73) Assignee: FOXTENN BGREEN, S.L., Barcelona (ES)

(*) Notice: Subject to any disclaimer, the term of this patent is extended or adjusted under 35 U.S.C. 154(b) by 163 days.

(21) Appl. No.: 14/785,046

(22) PCT Filed: Apr. 16, 2014

(86) PCT No.: PCT/ES2014/070326
§ 371 (c)(1),
(2) Date: Oct. 16, 2015

(87) PCT Pub. No.: WO2014/170527
PCT Pub. Date: Oct. 23, 2014

(65) Prior Publication Data
US 2016/0086323 A1 Mar. 24, 2016

(30) Foreign Application Priority Data
Apr. 17, 2013 (ES) .................................. 201330546

(51) Int. Cl.
*G06T 7/20* (2017.01)
*G06T 7/00* (2017.01)
(Continued)

(52) U.S. Cl.
CPC .......... *G06T 7/004* (2013.01); *A63B 71/0605* (2013.01); *G06T 7/20* (2013.01);
(Continued)

(58) Field of Classification Search
CPC ........ A63B 2071/0611; A63B 71/0605; G06T 2207/10016; G06T 2207/30224;
(Continued)

(56) References Cited

U.S. PATENT DOCUMENTS 9,036,864 B2 * 5/2015 Johnson .................... G06T 7/20
382/103
2004/0204239 A1 * 10/2004 Saikawa ................. A63F 13/10
463/30
(Continued)

FOREIGN PATENT DOCUMENTS

EP 2343106 A2 7/2011
WO 02/053232 A2 7/2002
(Continued)

OTHER PUBLICATIONS

Qazi et al, Automated ball tracking in Tennis Videos, 2015.*
(Continued)

*Primary Examiner* — Shan E Elahi
(74) *Attorney, Agent, or Firm* — Maier & Maier, PLLC

(57) ABSTRACT

A method and system for determining whether a spherical element impacts with a component of a playing field, or arranged on or proximate thereto. The method includes acquiring images of a surveillance area of a field that covers at least part of said component, such as a delimiting perimeter line of a game area or a target, performing an approximate detection of an impact of a spherical element relative to that component or proximate thereto, with an object detection and recognition system that can discern when the detected object is indeed a spherical element, automatically selecting one of the images acquired for the same point in time and that includes the area where said impact has occurred, and analysing the selected image to check if the spherical element has impacted or not with the component.

22 Claims, 3 Drawing Sheets

(51) Int. Cl.
*A63B 71/06* (2006.01)
*H04N 7/18* (2006.01)
*G06T 7/70* (2017.01)

(52) U.S. Cl.
CPC .............. *G06T 7/70* (2017.01); *H04N 7/18* (2013.01); *A63B 2071/0611* (2013.01); *G06T 2207/10016* (2013.01); *G06T 2207/30224* (2013.01); *G06T 2207/30228* (2013.01)

(58) Field of Classification Search
CPC . G06T 2207/30228; G06T 7/004; G06T 7/20; G06T 7/70; H04N 7/18
USPC ........................................................ 348/157
See application file for complete search history.

(56) References Cited

U.S. PATENT DOCUMENTS

| | | | | |
|---|---|---|---|---|
| 2008/0200287 | A1* | 8/2008 | Marty | A63B 24/0003 473/459 |
| 2010/0118117 | A1* | 5/2010 | Kroll | G03H 1/02 348/40 |
| 2013/0038718 | A1 | 2/2013 | Nakagome | |
| 2013/0305156 | A1* | 11/2013 | Hohteri | G11B 27/105 715/19 |
| 2014/0013361 | A1* | 1/2014 | Monari | H04N 5/2252 725/62 |

FOREIGN PATENT DOCUMENTS

| | | | | |
|---|---|---|---|---|
| WO | WO 02053232 | A2 * | 7/2002 | ......... A63B 71/0605 |
| WO | WO-02053232 | A2 * | 7/2002 | ......... A63B 71/0605 |

OTHER PUBLICATIONS

Pingali et al, Ball tracking and virtual replays for innovative tennis broadcasts, 2000.*
Mukai et al, Analysis and evaluation of tennis plays by computer vision, 2011.*
Farshid Arman et al: "Model-based object recognition in dense-range images—a review", ACM computing surveys, vol. 25, No. 1, Mar. 1, 1993 (Mar. 1, 1993), pp. 5-43, XP55177859.
International Search Report dated Aug. 4, 2014 in corresponding PCT/ES2014/070326; 6pgs.
International Preliminary Report on Patentability dated Jul. 9, 2015 in corresponding PCT/ES2014/070326; 8pgs.
Written Opinion of the International Preliminary Examining Authority dated Mar. 26, 2015 in corresponding PCT/ES2014/070326, 9pgs.

* cited by examiner

METHOD AND SYSTEM FOR DETERMINING WHETHER A SPHERICAL ELEMENT IMPACTS WITH A COMPONENT OF A PLAYING FIELD, OR ARRANGED ON OR PROXIMATE THERETO

TECHNICAL FIELD

The present invention generally concerns, in a first aspect, to a method for determining whether a spherical element impacts with a component of a playing field, or arranged on or proximate thereto, by performing an approximate detection and a more refined detection comprising the automatically selection, in response to the approximate detection, of one or more surveillance images, and more particularly to a method wherein the approximate detection is performed by a system which can discern whether the detected object is indeed a spherical element.

A preferred application of the invention relates to judging whether the spherical element bounces inside or outside game areas.

A second aspect of the invention concerns a system suitable for implementing the method of the first aspect.

The invention preferably applies to a tennis match, where the game areas are the different rectangular areas of a tennis court, the spherical element is a tennis ball and according to the rules, the ball is considered to bounce within the game area if it touches any of the perimeter lines that delimit the area.

The invention also applies to the training of tennis players, to improve the accuracy of their shots, by the arrangement of targets on which the ball must bounce after hitting it.

STATE OF THE ART

When playing tennis, many balls bounce so fast on the lines delimiting the different game areas of the court, i.e. "in" or "out" of the court or the serving area, that the human eye is not able to follow them and they leave no trace, which becomes a source of problems.

There exist numerous proposals the purpose of which is to judge whether a spherical element, in particular a tennis ball, has bounced in or out of a game area.

The best known proposal, due to the adoption of its use in official tennis matches, is implemented by the system known as "Hawkeye", in which a simulation of the ball trajectory captured by costly high-speed cameras is reproduced, and allowing to see if the ball is "in" or "out" in theory with an accuracy of 3 mm.

This system has many drawbacks: it is very expensive (16 very costly cameras), it requires other people to watch the images and select the correct ones, and furthermore, the trajectory simulation has an estimated error margin of 3 mm, which many people consider to be in fact more than that value. The player does not see a real representation, it is a "leap of faith", since the images are simulated.

There are also proposals where the images analysed are not simulated, but real. Some patent documents relating to such proposals are cited below.

U.S. Pat. No. 8,199,199B1 provides a method and a system for registration of real time position of tennis ball relatively to the boundary lines of game areas on a tennis court, and which comprises capturing images of the court using at least one video camera sensitive to near-infrared radiation, and illuminating the court with near-infrared radiation from a light source displaced relatively to the video camera, in order to determine the trajectories of the tennis ball and its shadow, determining the point of intersection and comparing the position with previously calibrated boundary lines of court as a way of determining if a tennis ball bounces in or out of the game area.

The system proposed in said patent is overly complex since it must perform the detection and tracking of two moving elements, the ball and its shadow, and although a filtering of the captured images is proposed to avoid confusing these two elements with other moving elements present in the field of view of the video camera, the results of this filter are doubtful, especially with regard to the shadows of other objects that may interfere with the shadow of the ball.

Furthermore, the efficiency of the implementation of such a system is also very doubtful, since, especially as regards the shadow of the ball, this will vary depending on the points where the video camera or cameras are located, and the light source, and in order to appreciate it clearly the video camera must be located at a certain height, which makes it difficult to ensure that at the point of intersection of the ball and its shadow the ball has in fact made contact with the court or, even if it does, the precise point of the court it touched.

From international application WO2007098537A1 a method and system is known that contains, respectively, the features of the preamble of the independent claims of the present invention. The method and system proposed in WO2007098537A1 aims to determine parameters of contact between bodies, such as the bounce of a spherical element on a playing field, by means of performing an approximate detection involving the detection of localized infrared emissions owing to heat generated by the friction between the bodies or the deformation of at least one of the bodies, and the automatic selection and subsequent display of an image or images associated with this approximate detection and which includes details of the scene where this possible contact occurred, in the infrared field and preferably also in the visible field, to enable a visual inspection to determine, for example, if the spherical element has bounced in or out of a game area.

The system used to perform the aforementioned approximate detection in WO2007098537A1, i.e. detecting infrared emissions, it is very inefficient, since the infrared emission can be produced for various unwanted causes other than the contact between the bodies of interest, i.e. that are not associated, for example, with the contact between the spherical element and the sports court. Such causes can be diverse, ranging from the contact caused by a body that is not of interest, such as a leaf falling on the court or the player himself moving through it, to sudden changes in temperature in the area of interest, for example owing to the presence of areas of sun and shade therein, or because the tennis court is an outdoor court subjected to high temperatures.

An earlier and less efficient detection system than those mentioned above, and which is not based on images, is described in patent GB2292218, which proposes a method and apparatus for judging whether a tennis ball has bounced on a line using an array of photo-detectors upon which a single collimated laser beam strikes, detecting the presence and trajectory of the ball according to the photo-detectors in front of which the ball passes, i.e. a system that could be considered as an alternative to image acquisition system proposed in WO2007098537A1, and clearly outperformed by the latter in terms of detection efficiency.

Patent GB2292218 does not describe, or even hint, that the object to be detected may not be a tennis ball, therefore no solution is proposed to this problem completely ignored by GB2292218: neither an approximate detection system, as proposed by WO2007098537A1, nor any other kind of mechanism auxiliary to the photo-detection system. It should be noted that such a photo-detection system, among other disadvantages, such as for example misinterpreting as a bounce on the line the crossing of the beam through an area that is not on the line (both the emitter and receiver are separated by a certain distance from the ends of the line to be monitored), it has the disadvantage that it is clearly unable to perform three-dimensional detection, i.e. it only performs a two-dimensional detection which makes it obviously impossible to detect a sphere, i.e. a three-dimensional object, at most being capable of detecting whether the object projects, in any of its positions, a two-dimensional circular silhouette which could happen even though the object is not spherical.

On the other hand, several different proposals are known concerning training systems providing one or several targets on the tennis court in order for the player tries to hit the ball so that it bounces on the selected target, and that detect, with greater or lesser precision, in what areas of the tennis court the ball impacts after the player hits it.

One such proposal is described in US2008293522A1, which provides a freely positionable tennis court practice target as well as a display that responds to a signal generated by the target (for example, wirelessly) and provides an indication when each target area is impacted. The display shows the number of impacts in each area, and light and/or sound indicators indicate when the impact occurred in each area. The target is a mat with areas sensitive to impacts, configured for example by piezoelectric elements or other sensors.

Patent ES2421399T3 proposes one of such target mats to detect the impacts of balls.

The document of patent TW201135216A proposes detecting the areas of impact of the ball on, in this case, a ping pong table, by using an array of laser beam transmitters and receivers.

Moreover, international application WO2013124856A1 concerns a system for monitoring and analysing moving objects applicable, among others, to tennis, consisting in marking the different positions of a virtual opponent on the tennis court using a laser pointer or with a hologram, automatically following predefined training programs or simulations of the virtual opponent. The detection of where the tennis ball impacts, i.e. whether it does on the virtual opponent or the mark thereof, is performed by a system based solely on cameras.

All the training systems cited that provide one or more targets on the tennis court can clearly be improved in terms of accuracy in detecting the impact of the ball on target.

SUMMARY OF THE INVENTION

It is necessary to provide an alternative to the prior art which will cover the voids found therein and, in particular, that offers increased performance and efficiency, in terms of the percentage of successes or guesses, clearly superior to those obtained with the method and system proposed by WO2007098537A1, and which moreover also clearly improves the detection accuracy of the impact of a spherical element on a target in relation to known systems and methods.

To this end, the present invention relates, in a first aspect, to a method for determining whether a spherical element impacts with a component of a playing field, or arranged on or proximate thereto, where said field is formed by a number of game areas, wherein the method comprises:

a) acquiring a sequence of images of at least one area of surveillance of said playing field covering at least part of at least said component;

b) performing an approximate detection of the impact of a spherical element with said component or proximate thereto;

c) automatically selecting, in response to said approximate detection, at least one image, from said sequence of images, acquired for the same point in time and that includes the area where said impact took place; and d) analysing the at least one selected image to check if the spherical element has really impacted or not with said component.

Unlike the known proposals, the method proposed by the first aspect of the present invention comprises, characteristically, performing the aforementioned approximate detection with an object detection and recognition system that can discern automatically when the object detected is indeed a spherical element, for which purpose, obviously, the object detection and recognition system is of a three-dimensional type.

According to a preferred embodiment, the component of the playing field is one of the perimeter lines among those perimeter lines that delimit the game areas, and the method is intended for judging whether a spherical element bounces in or out of these game areas, with the bounce constituting said impact, where:

said step a) comprises acquiring a sequence of images from at least one area of surveillance of the playing field that covers at least part of at least one of said perimeter lines, generally consisting of one or more areas of surveillance, where together they cover all the perimeter lines of the game areas;

said step b) comprises performing an approximate detection of the bounce of a spherical element on one of said perimeter lines or proximate thereto;

said step c) comprises automatically selecting, in response to said approximate detection, at least one image, from said sequence of images, acquired for the same point in time and that includes the area where said bounce took place; and said step d) comprises analysing the at least one selected image, to check if the spherical element has really bounced or not on said perimeter line, in order to judge if the spherical element has bounced inside or outside the game area delimited by said perimeter line of step b)

According to another embodiment (in general alternative to the above but which also could be combined therewith), the component of said playing field is a target arranged inside at least one of said game areas, which are delimited by a perimeter lines, wherein:

said step a) comprises acquiring a sequence of images of at least one area of surveillance of said playing field covering at least part of said target;

said step b) comprises performing an approximate detection of a bounce of a spherical element on said at least one target, or proximate thereto;

said step c) comprises automatically selecting, in response to said approximate detection, at least one image from said sequence of images acquired for the same point in time and that includes the area where said bounce took place; and said step d) comprises analysing the selected image, of which there must be at least one, to check if the spherical element has really bounced or not on the target of step b).

According to a preferred variation of this embodiment example where the component is a target, the latter is constituted by a sub-area of at least one of the game areas and is marked physically or virtually on the ground, projected on the ground (e.g. using a laser pointer) or on displaying means visible to the player, for example on a large screen placed on the playing field.

Less preferably, the target does not consist of a sub-area of the game area but instead placed thereupon, not necessarily at ground level, physically or virtually (as in the case of a hologram).

Continuing with this embodiment, the method comprises, optionally, modifying the shape, size and/or position of the target, with reference to the playing field, and performing the steps a) to d) to detect whether or not the spherical element has bounced on the modified target.

Alternatively, or in addition, the method comprises, after completion of step d) for a target, proceeding to select another target and performing steps a) to d) to detect whether or not the spherical element has bounced on said another target.

For the embodiment in which the method of the first aspect of the invention is applied to determine whether spherical element bounces on a target, this is preferably associated with a training method or system that performs the aforementioned selection and/or modification or adaptation of the targets, as well as their scoring and repetition, at the choice of the player or coach, for example remotely through a mobile computing device (such as a "tablet" or "smartphone") or automatically following a training pre-programmed program, and that measures the results obtained by the player, depending on his aim when hitting the spherical element at the targets. All the points, areas (i.e. targets or different target areas, etc.), can be viewed live on a screen on the playing field and/or controlled through said mobile computing device.

Preferably said training system includes a mobile robot or machine which, if the playing field is a tennis court, moves along the court launching balls based on a configured series or in relation to the position of player, which is identified by the object detection and recognition system itself.

This training system optionally includes other kinds of measuring devices, e.g. speed and/or power of the ball hit by the player, thereby providing not only the precision of the stroke as a result, but also power and/or speed measurements.

Although this application has not claimed such a training method or system which is associated with the method and/or system of the present invention, the description included here is sufficient for supporting and seeking the independent protection of such a training method and system, for example through a divisional application.

The method proposed by the first aspect of the invention method is also applicable to the detection of the impact of a spherical element with a component that is neither of the two explained above, i.e. that is not a perimeter line or a target, like for example, if the playing field is a tennis court, a post (near the playing field, such is case of the posts holding up the centre net), the centre net (both the portion included within the field of play delimited by the perimeter lines and the portion that is not, i.e., the area close to the field of play, etc.). For other kinds of playing fields, the components can be of various kinds, such as, for example, a basketball court, the rim of the basket or a player, etc.

For one embodiment, the method comprises using a three-dimensional scanner as the detection and recognition system, active or passive, employing any of those known in the prior art of the "non-contact" type, i.e. those which work by analysing the return signal (emitted expressly in the case of active systems, or the environment's own signal in the case of passive systems) to capture the geometry of an object or scene. Electromagnetic waves can be used (from radio waves to X-rays) or ultrasound which may be combined with different devices for transmission and detection, such as a laser emitter (for example structured light or modulated light) and a detector comprising a camera that detects the reflected light.

For a preferred embodiment, this three-dimensional scanner system is an active laser scanner system, such as a LIDAR system (acronym for "Light Detection and Ranging" or "Laser Imaging Detection and Ranging") that includes one or more laser scanners.

Alternatively, the three-dimensional scanner system consists of a plurality of cameras operating synchronously and spatially arranged so as to acquire three-dimensional information, and that are thus capable of detecting and recognizing three-dimensional objects, and therefore automatically discern when the detected object is indeed a spherical element.

Depending on the embodiment, the aforementioned approximate detection in step b) comprises performing two or more detections including at least a moment when said impact or bounce happens and/or at least a moment immediately before the impact or bounce and/or at least a moment immediately after the impact or bounce, using in said step c), as a time point for the automatic selection of said image, at least one of the time points of said detections, preferably the one corresponding to the impact or bounce or the moment immediately before.

For the embodiments where the component on which to detect the impact of the spherical element is located at ground level, as is the case of the perimeter line, and, in general, of the targets, such detection is performed approximately for the same height or close to the ground, in order to detect the spherical element when it bounces thereon and when it is about to or has just bounced and according to an embodiment using two respective laser scanners.

If the component is not located at ground level, such as the centre net of a tennis court, the approximate detection is performed at a suitable height for this component.

According to one embodiment, the method comprises, prior to the approximate detection and, in general, at greater height thereof, performing a pre-detection of the passage of the spherical element through at least two points located at different heights, and performing, based on said pre-detection, a prediction of the trajectory to be followed by the spherical element towards the ground and a predetermination or predefinition of an approximate area where the impact or bounce will occur.

For an embodiment where the approximate detection is not implemented at ground level, as in the case discussed above in which the component is the centre net of a tennis court, at least one pre-detection like the one described takes place at a lower height than the approximate detection, in order to predict the upward trajectory of the spherical element, as would be the case where a tennis player hits a ball from down going up in order to get over the centre net. This embodiment is an alternative (in the case of wanting to cover only an upward trajectory) or complementary (in the case of wanting to cover both trajectories: the one going up and going down) to the previous embodiment.

Said predetermination or predefinition of the approximate area where the impact or bounce of the spherical element will occur, obtained as described in the preceding paragraphs or through any other kind of mechanism considered suitable by an expert in the matter, in itself represents an alternative to the approximate detection of step b). That is to say, according to another aspect of the present invention, alternative to the first aspect, the present invention concerns a method for determining whether a spherical element impacts with a component of a playing field, or arranged on or proximate thereto, said field formed by game areas, wherein the method comprises:

a) acquiring a sequence of images of at least one area of surveillance of said playing field covering at least part of at least said component;

b) performing a predetermination or predefinition of the approximate area where the impact or bounce of the spherical element will occur;

c) automatically selecting, in response to said predetermination or predefinition of an approximate area, at least one image from said sequence of images acquired for the same point in time as the expected impact or bounce, and that includes the area where said impact or bounce is expected to take place; and d) analysing the selected image, of which there must be at least one, to check if the spherical element has really impacted, or bounced, or not with said component.

The method proposed by this alternative to the first aspect of the present invention comprises, preferably, performing the aforementioned approximate detection with an object detection and recognition system that can discern automatically when the object detected is indeed a spherical element, for which, obviously, the object detection and recognition system must be of a three-dimensional type.

The method comprises carrying out such pre-detection using at least two detection devices, such as two laser scanners from the object detection and recognition system, located at the two aforementioned points at different heights.

The method comprises automatically discerning when the detected object is indeed a spherical element based on the difference in the detection signals caused by being detected by the detection and recognition system in comparison with the detection signals resulting from the detection of other elements, stationary or mobile, of at least different shape and size.

The detection and recognition system "knows" where the feet of the players or any other element of the court are located, allowing it to make the distinction between the spherical element and these elements. Subsequently, when the system proposed by the second aspect of the invention is explained, there will be a more detailed description of the system components and how they operate to perform the aforementioned automatic differentiation and detection of the spherical element from other elements. The description below of the operation of such elements shall also be considered valid for defining the actions performed according to the method proposed by the first aspect of the invention, for some embodiments.

For other embodiments, the method comprises using as the detection and recognition system, alternatively or complementary to the laser scanner system, other types of detectors such as linear detectors (in this case in a complementary manner to a suitable system for capturing three-dimensional information) or cameras, or other types of scanning systems, like those indicated above.

For a preferred embodiment, said spherical element is a tennis ball and the playing field is a tennis court, where the game areas are the different rectangular areas of the tennis court, so that the method determines whether the ball has bounced in or out of the court or whether it has bounced inside or outside the rectangular area used for the service.

Continuing with this preferred embodiment applied to tennis, according to a variation thereof, the method proposed by the first aspect of the present invention comprises selecting as perimeter lines on which check if the tennis ball has really bounced or not, the following:

those demarcating a respective service area (left or right) to which a player will serve or has served, to judge whether the tennis ball has bounced in or out of the service area; or those demarcating the total game area for a single or a doubles match during the rally after the service.

Additionally, the method comprises receiving information on whether, after the service, the tennis ball has touched the net or not, and based on this information, after judging whether the tennis ball bounces in or out of the service area, the method comprises issuing a signal indicating that:

the serve must be repeated, if the ball has bounced inside the service area but after touching the net, or the serve must not be repeated, if the ball has bounced outside the service area after touching the net.

The detection of whether or not the ball has touched the net can be performed with a sensor arranged on the net itself or even by the object detection and recognition used by means of the method proposed by the first aspect of the present invention.

Depending on the type of game played, if a spherical element has touched the perimeter line it will be considered to have bounced inside the game area, such is the preferred case applied to tennis, or out of the game area, as would be the case, less preferred, applied to basketball.

According to one embodiment, step d) comprises showing the selected image or images on displaying means to allow performing the aforementioned analysis by visually judging the image, or to supplement said analysis.

For one embodiment, the analysis of step d) is an automatic analysis, performed by image processing programs or algorithms.

Depending on the embodiment, the method comprises initiating step d) upon request of a player or umpire, or automatically after the selection of step c).

In the first case, the request of the player or umpire may require the intervention of a third party, such as an operator, to initiate the step d) upon receipt of the request, by gesture or voice, by the player or umpire, or automatically, for example by implementing a control system that recognises the gesture of the player or umpire and automatically activates the start of step d).

Such gesture recognition and control systems are known, ranging from those based on the analysis of images that capture these gestures to more sophisticated systems that include a movement detector device worn by the player or umpire, such as an inertial and/or electromyographic wristband that can recognize the gesture performed with the wrist and/or hand and/or arm by the player and/or umpire.

According to one embodiment, step c) of the method proposed by the first aspect of the invention comprises selecting a plurality of images, arranged in sequence, which includes the image acquired for the same point in time as the approximate detection and images for points in time before and after that point.

The aforementioned automatic analysis is, according to one embodiment, relative to said plurality of selected images, and includes at least the choice of the image where the spherical element appears most deformed in contact with ground, and/or with said component, and the subsequent automatic analysis thereof and/or display thereof on said displaying means.

For one embodiment, step d) comprises a video playback including said plurality of images, in slow motion forward and/or backwards and/or stopping in order to perform the aforementioned visual judgment.

For another embodiment, complementary or alternative to the above, step d) comprises displaying a magnified area of interest of the selected image or images centred on the area of impact or bounce of the spherical element.

The method comprises performing step a), according to a preferred embodiment, by means of a plurality of high speed cameras covering the various components of the playing field, or arranged on or proximate thereto, and/or different sections of the perimeter lines from both sides and/or ends thereof and/or all of the targets from different sides thereof.

According to one embodiment, both in the first aspect and in the aforementioned alternative aspect to the first aspect, the method comprises using the above-described predefinition of an approximate area where the impact or bounce will occur to activate (if not already activated) and/or control at least one of said high-speed cameras whose coverage area includes the approximate predefined area, this control being relative to, for example, the performance of a micro-focus of the activated camera in order to focus the image acquisition area to the area of interest.

A second aspect of the invention relates to a system for determining whether a spherical element impacts with a component of a playing field, or arranged on or proximate thereto, where said field is formed by a number of game areas, wherein the method comprises:

means for acquiring and recording images configured and arranged to acquire and record a sequence of images of at least one surveillance area of said playing field that covers at least part of said component;

means of detection configured and arranged to perform an approximate detection of an impact of a spherical element with said component or proximate thereto;

means of automatic selection connected to said means of detection, with access to said recorded images, and configured to automatically select, in response to said approximate detection, at least one image of said sequence of images acquired for the same point in time and which includes the area where said impact has been produced; and means of displaying and/or of analysis configured for, respectively, displaying said at least one selected image, to allow it to be judged by visual analysis, and/or to analyse it automatically, to check if the spherical element has really impacted or not with said component.

Unlike known systems, in the system proposed by the second aspect of the present invention, characteristically, the detection means comprise an object detection and recognition system that can discern automatically when the object detected is indeed a spherical element.

According to a preferred embodiment, the component of the playing field is one of the perimeter lines among those perimeter lines that delimit the game areas, and the system is provided for judging whether a spherical element bounces in or out of these game areas, with the bounce constituting said impact, where:

said means for acquiring and recording images are configured and arranged to acquire and record a sequence of images of at least one surveillance area of said playing field that covers at least part of at least one of said perimeter lines;

said means of detection are configured and arranged to perform an approximate detection of the bounce of a spherical element on one of said perimeter lines or proximate thereto;

said means of automatic selection connected to said means of detection, with access to said recorded images, and configured to automatically select, in response to said approximate detection, at least one image, of said sequence of images, acquired for the same point in time and which includes the area where said bounce has been produced; and said means of displaying and/or of analysis are configured for, respectively, displaying said at least one selected image, to allow it to be judged by visual analysis, and/or to analyse it automatically, to check if the spherical element has really bounced or not on said perimeter line of said approximate detection, in order to judge if the spherical element has bounced inside or outside the game area delimited by said perimeter line.

According to another embodiment (in general alternative to the above but which also could be combined therewith), the component of said playing field is a target arranged inside at least one of said game areas, which are delimited by perimeter lines, wherein:

said means for acquiring and recording images are configured and arranged to acquire and record a sequence of images of at least one surveillance area of said playing field that covers at least part of at least said target;

said means of detection are configured and arranged to perform an approximate detection of a bounce of a spherical element on said at least one target, or proximate thereto;

said means of automatic selection are connected to said means of detection, with access to said recorded images, and configured to automatically select, in response to said approximate detection, at least one image, of said sequence of images, acquired for the same point in time and which includes the area where said bounce has been produced; and said means of displaying and/or analysis are configured for, respectively, displaying said at least one selected image, to allow it to be judged by visual analysis, and/or to analyse it automatically, to check if the spherical element has really bounced or not on the target in step b).

According to a preferred variation of this embodiment where the component is a target, the latter is constituted by a sub-area of least one of the game areas, whereby the aforementioned means of displaying are also configured to display said target by means of an image thereof taken by at least one camera, when the target is marked physically on the ground, or by means of a virtual representation thereof, when the target is only marked virtually, projected on the ground or via displaying means visible to the player.

Preferably, the spherical element is a tennis ball and the playing field is a tennis court, with the game areas being the different rectangular areas of the tennis court.

For one embodiment, the detection and recognition system includes any three-dimensional scanning system, active or passive, of those described above with reference to the method proposed by the first aspect of the invention, or any known system.

According to a preferred embodiment, the detection and recognition system includes at least one laser scanner system which comprises one or more laser scanners.

According to one embodiment, the detection and recognition system comprises, in order to perform the aforementioned approximate detection, at least a first detection device (such as a laser scanner) arranged at ground level or proximate thereto, with its field of coverage including at least a portion of the component and/or of the perimeter line and/or of the target, on or near to which said impact or bounce occurs.

In one embodiment, the detection and recognition system comprises at least a second and a third detection device (such as two laser scanners) located in two respective points at different heights, both higher than the first detection device, arranged and configured to detect the passage of a moving element through at least said two points, the detection and recognition system being configured to perform, based on the detection of the passage through said two points, a prediction of the trajectory to be followed by the moving element, and to discern whether or not it is a spherical element.

When the moving element whose passage has been detected by said two points is the spherical item, the aforementioned prediction of his trajectory also includes the previously described (with reference to the method of the first aspect of the invention) prediction and predefinition of an approximate area where the bounce will occur.

The detection and recognition system can automatically discern when the object detected is indeed a spherical element because it includes a processing system that implements a complex algorithm with access to detection information of all the detection devices listed above, both previously recorded for the stationary elements located within the areas of coverage of the detection devices, and those corresponding to current detection of moving elements, first through the second and third detection devices described above, to detect the passage of a moving element and its trajectory, and then with the detection device arranged at ground level, allowing to check, for example, if the moving element was a person's foot.

The only moving element with the dimensions of the spherical element is the spherical element itself, whose detection by the detection device produces signals that are perfectly distinguishable from the signals produced by other elements.

For the preferred embodiment where the detection devices are laser scanners, these allow distance information to be obtained with respect thereto from each point of contact of the laser beam with the detected item, with the grouping and number of contact points being very different when the element is a spherical element or, for example, a player's foot.

Advantageously, the detection and recognition system comprises a plurality of the first, second and third detection devices arranged to cover different areas of, and above, the game areas, which allows, in the case where these are laser scanners, to calculate the position of each object in the game areas at all times.

For one embodiment, the system comprises a control means connected to the automatic selection means and with said means of displaying and/or of analysis, to control the latter so that they display (preferably enlarged) and/or analyse the selected image or images, e.g. on a screen located on the court or any other type of display device.

The means for acquiring and recording images of the system proposed by the second aspect of the invention comprises, according to one embodiment, a plurality of high speed cameras (at least in the order of 1000 frames per second) arranged so that their coverage areas cover the various components of said playing field, or arranged on or proximate thereto, from different sides of the components, and/or different sections of the perimeter lines from both sides and/or ends thereof and/or all the targets from different sides thereof, such that in the selection of the image performed by the automatic selection means, based on information of the area where the impact or bounce of the ball has been approximately detected, the high-speed camera monitoring that area is selected, in turn selecting the image captured by that camera for the exact millisecond the approximate detection occurred.

These high speed cameras are preferably arranged at ground level, or substantially at ground level, so that they exactly capture the contact surface of the ball when it is deformed on the ground, which, together with the large number of images captured per second by the cameras, allows the image where the ball appears most distorted to be chosen for analysis, without any kind of simulation, whereby the accuracy of the system is very high.

According to one embodiment, at least one of the high-speed cameras or another camera of the means for acquiring and recording images, preferably two, is mobile.

The memory or memories where the images are recorded are part of the electronic circuitry of the cameras themselves or of an external electronic system. According to a variant of this embodiment the mobile cameras and/or TOF cameras ("Time Of Flight") are mounted on intelligent mobile robots that "understand" the circumstances of the game. Each of these robots includes a supervision, tracking and prediction system that makes it aware of the circumstances of the game, including the position at all times of the players and the spherical element, and that predicts, by calculating, where the spherical element is going to impact or bounce, making the robot suitable for, based on such knowledge and prediction, finding the best angle of capture of the mobile camera and moving in the direction of the area where the spherical element is expected to bounce, allowing an image of the most appropriate area of interest to be obtained and therefore a more accurate calculation.

It is also possible, according to another embodiment, to use the above-described predefinition of an approximate area where the bounce will occur in order to control the robot and direct it thereto for the purpose of obtaining detailed images of the bounce of the spherical element.

The system of the second aspect is adapted to implement the method of the first aspect, performing the steps of automatic selection and automatic image analysis generally by means of software installed in a computer system that implements the selection and analysis means. The description of all the embodiments of the method proposed by the first aspect of the invention are therefore valid for describing analogous embodiments relating to the system proposed by the second aspect of the invention, the latter incorporating appropriate means for performing the functions described in relation to the method, including the means already described above or additional thereto.

The aforementioned software installed on a computer system that implements the selection and analysis means therefore allows the live and near real-time analysis of whether the ball is out or not (the information is preferably transmitted in less than a second), by real analysis of the image of greater contact, not by simulation. Another option is for the player to view the image of the bounce and judge alone or ask for the system to automatically analyse the bounce.

The player may request this automatic analysis and/or display of the selected image, that may be called a "Fox Eye" request, by making a hand gesture, which is interpreted by any of the gesture recognition systems mentioned above, incorporated in the system proposed by the second aspect of the invention, such as an inertial and/or electromyographic wristband worn by the player, which understands and decodes the hand gesture as a preset movement, giving the order to the system to view the image and/or perform the automatic analysis.

The system proposed by the second aspect of the invention is a system of maximum precision (to one millimetre), works with real images, i.e. not simulated, that, for its embodiments where all the actions are performed automatically, does not need the intervention of third parties and is installable on any tennis court.

Even if the system proposed by the second aspect of the invention is installed outdoors, it is not affected by high temperatures on the court, nor by shadows, nor by sunlight, nor by people or other objects present within the area of coverage of the detection and recognition system, since it "knows" what each detected object is. The size and shape of the spherical element allows the computer means, with the data of the detection devices, to clearly differentiate it from any other object. Neither can any potential intermediate elements between the camera and the spherical element have a negative influence, since there are cameras for acquiring images from several different angles, always guaranteeing "clean direct" coverage of the spherical element.

The system does not depend on simulations to be aware of the real bounce of the ball, nor does it require others to manipulate the system nor involve excessive costs (each high speed camera has a much lower cost than each camera used in the "Hawk-Eye" system).

BRIEF DESCRIPTION OF THE DRAWINGS

The aforementioned and other advantages and characteristics will be understood more fully from the following detailed descriptions of embodiments with reference to the accompanying drawings, to be taken by way of illustration and no limitation, in which.

DETAILED DESCRIPTION OF AN EMBODIMENT

Figure 1:
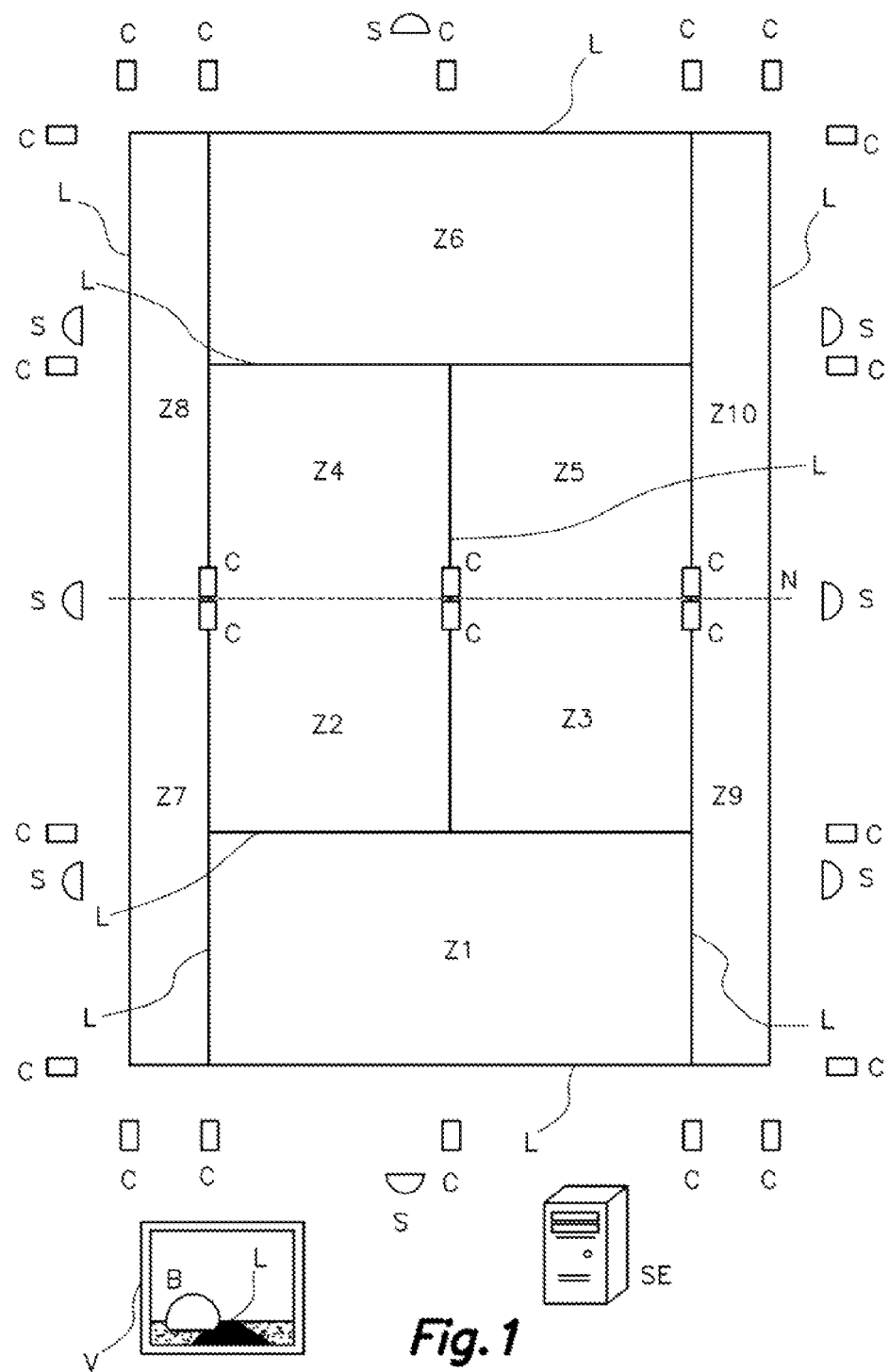
FIG. 1 is a schematic representation in ground plan view of the system proposed by the second aspect of the invention with its elements arranged on a tennis court, and associated with the detection of the bounce of a tennis ball on perimeter lines delimiting the game areas.

FIG. 1 illustrates a tennis court with a series of rectangular game areas Z1-Z10 into which the court is divided, for use during a tennis match, whereby the rectangular areas Z1-Z10 are delimited by perimeter lines L, which both define the total game area, which for a singles match does not include areas Z7, Z8, Z9 and Z10 but which in doubles matches are included, as the sub-areas of game, such is the case of areas Z2, Z3, Z4 and Z5, corresponding to the service areas, it being of interest to detect if the tennis ball bounces both on the perimeter lines L of said service areas Z2-Z5 L lines, during the serve, and on the lines which delimit the total game area, during the rally after the service.

The system proposed by the second aspect of the invention includes, for the embodiment illustrated by said FIG. 1:
- image acquisition and registration means that include a plurality of high speed cameras C, arranged around the tennis court, preferably at ground level, covering different portions of perimeter lines L and areas adjacent thereto;
- means of detection configured and arranged to make an approximate detection of a bounce of the tennis ball B on one of the perimeter lines L or proximate thereto, and that comprise a system of detection and recognition of objects that allows to discern when the detected object is indeed a tennis ball, and which includes a series of laser scanners or groupings of laser scanners S, which together cover all the perimeter lines L;
- automatic selection means, which in the illustrated embodiment are implemented in the electronic system SE, in connection with the detection means, with access to the recorded images, and configured to automatically select, in response to the approximate detection, one or more of the recorded images, including the image corresponding to the point in time associated with the approximate detection and which includes the area where the bounce has occurred;
- means of displaying V to show the selected image to allow it to be judged by visual analysis; and
- means of analysis, which in the illustrated embodiment are implemented in the electronic system SE, and which are configured to automatically analyse the selected image.

It should be understood that the cameras C are represented schematically for greater clarity. In fact, in particular as regards the cameras C arranged on either side of the centre net N, adjacent thereto, these do not overlap a portion of the lines L such as could be understood by the schematic representation thereof, but instead they are of a size and/or are arranged so that their coverage area also includes the portions of the perimeter line immediately adjacent to the respective side of the centre net N.

Alternatively the arrangement of the cameras adjacent to the net N can be dispensed with, and instead one or cameras C arranged to one side of the court, but at a distance from the net N, can be used, whose angle of vision allows images to be captured that are behind the net N (through, for example, a translucent portion thereof), in particular images of the perimeter lines L of the other side of the court.

According to one preferred embodiment, one or preferably each of the rectangles C do not represent only one camera but instead various cameras, for example four, stacked one over the other and with different angles of vision to cover different sections of the same perimeter line L.

As regards the scanners S, these are preferably arranged at different heights in order to detect different kinds of objects, including some at a height considered suitable for detecting the players.

The schematic representation of FIG. 1 does not show the connections existing between the different means of the system proposed by the second aspect of the invention, either because these are wireless or in order to provide a greater clarity in the illustration. It should be understood that any type of connection between those means is possible.

Also, although FIG. 1 only schematically represents an electronic system SE, for other embodiments, not illustrated, the system of the second aspect of the invention comprises the inclusion of one or more electronic systems corresponding to one or more of the aforementioned image recording, selection and analysis means, as well as the control means for the laser scanners L and cameras C.

FIG. 1 also shows a screen as a displaying means V, which displays a scene where the tennis ball B appears deformed when bouncing on a peripheral line L is shown, where said image, if it corresponds to the maximum deformation of the ball B, will be the image that will be automatically analysed and/or shown to the player or umpire on said screen V for its visual inspection.

Figure 2:
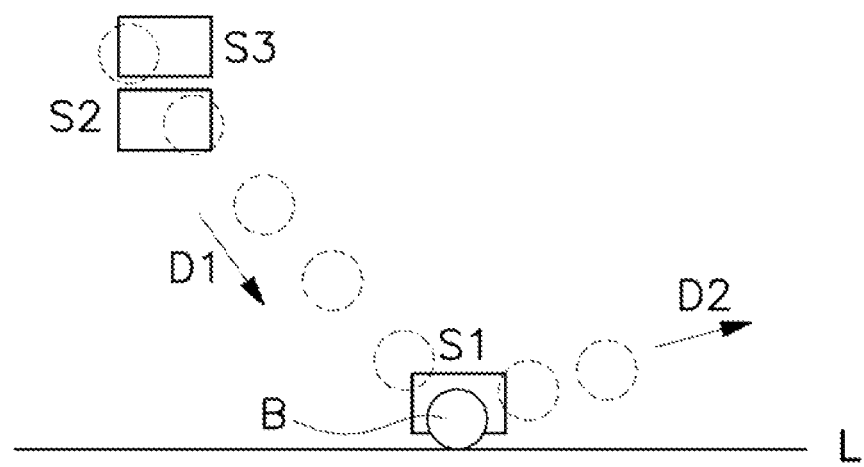
FIG. 2 is a schematic representation in elevation view of detection devices of the detection and recognition system proposed by the second aspect of the invention, arranged at different heights relative to a perimeter line of a game area.

For a preferred embodiment, each of the elements shown with the reference S in FIG. 1, includes three laser scanners, as illustrated in FIG. 2, one of them S1 arranged at ground level (or very close to it), or first level, and the other two S2, S3 arranged at a certain height from the first scanner, or second level, approximately at 80 cm for scanner S2 and 90 cm for scanner S3 (although these heights may be others for other embodiments).

FIG. 2 illustrates the trajectory followed by a tennis ball B until in bounces (moving according to arrow D1) on one of the perimeter lines L, and from when it bounces (moving according to arrow D2) thereon, the ball being illustrated with a solid line at the time of the bounce and with dashed line for the rest of its trajectories towards and from the bounce.

Continuing with the description of FIG. 2, during the trajectory of the ball B towards the bounce, this is first detected by the laser scanner S3 and immediately after by S2, considering such consecutive detections as representing the passage of a moving object, which the detection and recognition system identifies as tennis ball (as explained in a previous section). These scanners S2 and S3 operate, according to one embodiment, at a scan speed of 100 MHz, and allow the predefinition of a first approximate area or pre-area where the ball B will fall, with dimensions, in ground plan view, in the order of around 50 cm.

Following trajectory D1, the tennis ball B finally enters the coverage area of the scanner S1, which, according to one embodiment, operates at about 50 MHz, which, taking into account the average speed at which the ball B tends to travel, enables S1 to perform around two or three detections thereof (the aforementioned approximate detection), at the moment of the bounce and/or just before and/or just after it, within an approximate area of 15 cm at most, that, while it is relatively small cannot assure whether or not the bounce occurred on the perimeter line L, and therefore this approximate detection is used, as already explained above, to select the image or images captured by the cameras for the same point or points in time.

As explained in a previous section, the aforementioned predefinition of the area in which the ball B will bounce can be used to select and, if necessary, activate the camera best positioned to cover this area, and therefore to perform the mechanical micro-focus thereof if required to ensure greater accuracy and speed in the final answer, i.e. in the result of the analysis of whether the ball B has bounced inside or outside the game area.

All these actions happen in milliseconds and time is crucial to activate the camera and mechanically focus on the area of the bounce, if necessary, and therefore, to be able to perform the analysis of the chosen image almost in real-time with high definition without using mega-cameras, i.e. the very expensive cameras of the "Hawkeye" system.

The scanner S1, in its various detection points, before the bounce, during the bounce and right after, provides the approximate area of the bounce in a much more accurate manner than the area predefined by S2 and S3, but above all it gives information about the moment of the bounce and the adjacent moments that allow the system and its choice to be optimised to be able to work with almost in real-time with the information from the selected high speed camera, thus achieving, thanks to the mechanical focus, maximum errors of half a millimetre compared with the 3 millimetres of the "Hawkeye" system.

Figure 3:
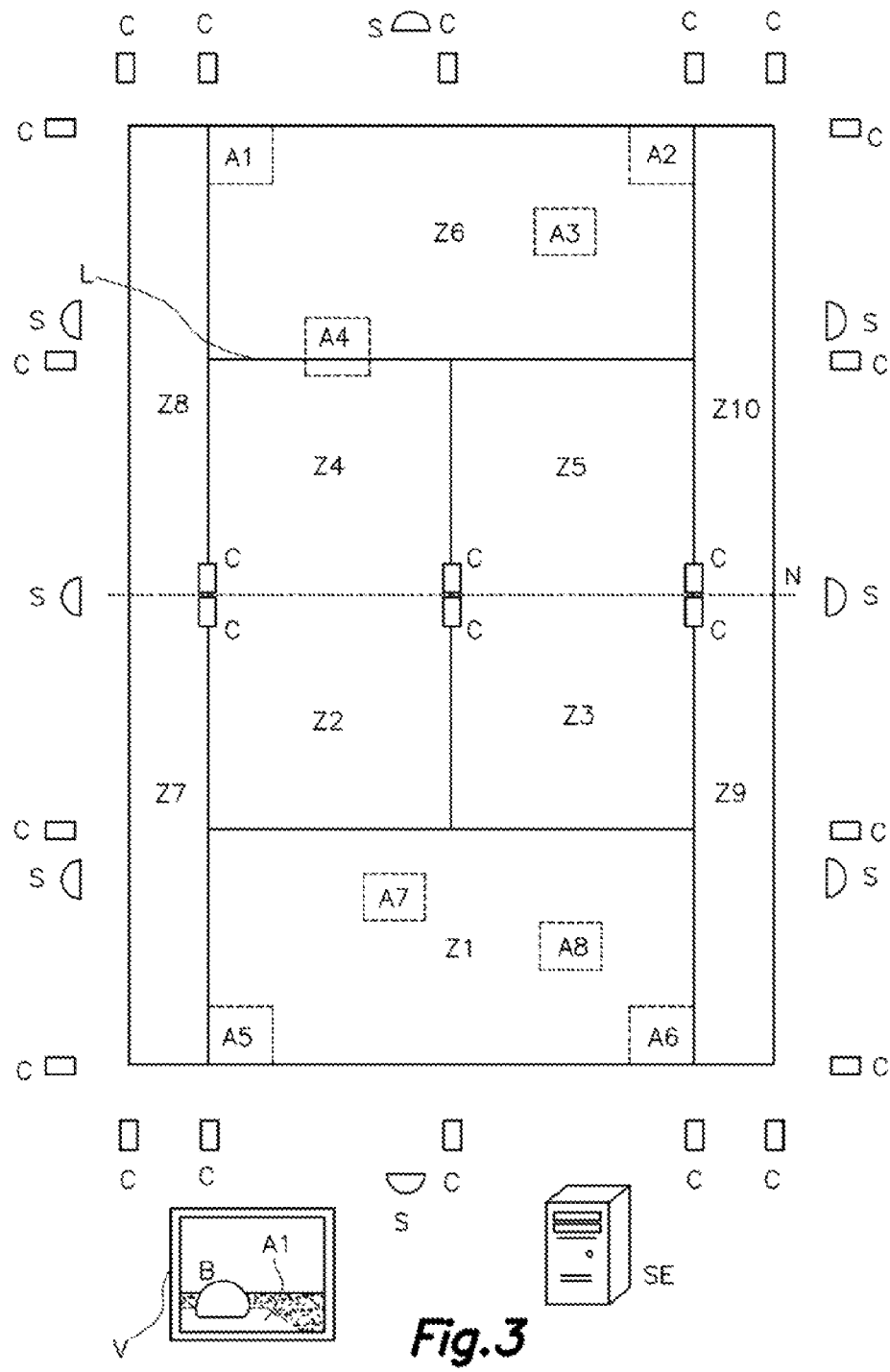
FIG. 3 is an analogous view to FIG. 1, but associated with the detection of the bound of a tennis ball on targets placed in different areas of the tennis court, and represented by dashed lines.

FIG. 3 shows the system proposed by the second aspect of the invention, incorporating the same elements as the system illustrated by FIG. 1, but applied to the detection of the bounce of the tennis ball B on some targets A1-A8 distributed throughout the court, within the game areas, in particular they have been illustrated within areas Z1 to Z6, or even within two areas, as is the case of the target A4 with respect to areas Z4 and Z6. Obviously, the illustration is schematic only, and a single movable target may be used from different positions.

According to one embodiment, targets A1-A8 will not be visible on the tennis court itself, but they will be virtual targets (or a single movable target occupying the different positions illustrated) visible on a screen that shows them in relation to the tennis court, i.e. to show, for example, a tennis court with the targets as shown in FIG. 3, or a part thereof (for example those placed on the side on which the player should aim the ball).

Also, although FIG. 1 only schematically represents an electronic system SE, for other embodiments, not illustrated, the system of the second aspect of the invention comprises the inclusion in one or more electronic systems of one or more of the aforementioned image recording, selection and analysis means, as well as of control means for the laser scanners L and cameras C.

FIG. 3 also shows the electronic system SE and a screen as a displaying means V, which displays a scene where the tennis ball B appears deformed when bouncing on one of the targets, specifically on target A1, which will be the image that will be automatically analysed and/or shown to the player or umpire on said screen V for its visual inspection.

The embodiments described with reference to FIG. 1 are also valid to describe analogous embodiments with reference to FIG. 3, simply by changing the component on which the bounce of the ball B occurs, that in FIG. 1 is the perimeter line L and in FIG. 3 is the target A1-A8 (obviously the same can be said for another kind of component than are not either the perimeter lines L or the targets A1-A8).

A person skilled in the art could introduce changes and modifications in the described embodiments without departing from the scope of the invention as defined in the attached claims.

The invention claimed is:

1. A method for determining whether a spherical element impacts with a component of a playing field, or with a component arranged on said playing field or proximate to said playing field, said playing field being made up of game areas, where the method comprises performing, with a three-dimensional type object detection and recognition system, the steps of:
   a) acquiring, with detection devices comprising a plurality of high speed cameras and scanners, a sequence of images of at least one area of surveillance of said playing field covering at least part of at least said component and storing the sequence of images on a memory;
   b) performing, by a processor on a computer, an approximate detection of the impact of a spherical element with said component or proximate thereto;

c) automatically selecting, by the processor, in response to said approximate detection, at least one image, from said sequence of images, acquired for the same point in time and that includes the area where said impact took place; and d) analysing, by the processor, said at least one selected image to check when the spherical element has really impacted or not with said component;

wherein:

said approximate detection being performed with the three-dimensional type object detection and recognition system and processor that can discern automatically when the object detected is indeed a spherical element; and prior to said approximate detection of step b) and at a greater height of said approximate detection of the impact, a pre-detection of the passage of the spherical element through at least two points located at different heights is performed with the detection devices, and based on said pre-detection, a prediction of the trajectory to be followed by the spherical element towards the ground and a predetermination or predefinition of an approximate area where the impact or bounce will occur is performed by the processor, said pre-detection being performed using at least two detection devices of said three-dimensional type object detection and recognition system located at different heights.

2. The method according to claim 1, wherein the scanners are laser scanners, and the three dimensional type object detection and recognition system further comprises ultrasound devices, and the method comprises performing said automatic discerning using said laser scanners to obtain distance information, with respect to said laser scanners, from each point of contact of the laser beams emitted by the laser scanners with the detected object, and based on said distance information obtained for a group of contact points.

3. The method according to claim 1, comprising judging whether a spherical element bounces inside or outside said game areas, where the game areas are delimited by perimeter lines, where:

said step a) comprises acquiring a sequence of images of at least one area of surveillance of said playing field covering at least part of at least one of said perimeter lines (L);

said step b) comprises performing an approximate detection of a bounce of a spherical element on one of said perimeter lines, or proximate thereto, said perimeter line constituting the aforementioned component of the playing field, and said bounce constituting said impact;

said step c) comprises automatically selecting, in response to said approximate detection, at least one image, from said sequence of images, acquired for the same point in time and that includes the area where said bounce took place; and said step d) comprises analysing, upon request of a player or umpire or automatically upon selection of the step c), the at least one selected image, to check when the spherical element has really bounced or not on said perimeter line, in order to judge when the spherical element has bounced inside or outside the game area delimited by said perimeter line of step b).

4. The method according to claim 1, wherein said element of the playing field is a target arranged in at least one of said game areas, which are delimited by perimeter lines, where:

said step a) comprises acquiring a sequence of images of at least one area of surveillance of said playing field covering at least part of said target;

said step b) comprises performing an approximate detection of a bounce of a spherical element on said at least one target, or proximate thereto;

said step c) comprises automatically selecting, in response to said approximate detection, at least one image from said sequence of images acquired for the same point in time and that includes the area where said bounce took place; and said step d) comprises analysing, upon request of a player or umpire or automatically upon selection of the step c), the selected image, of which there must be at least one, to check when the spherical element has really bounced or not on the target of step b).

5. The method according to claim 1, wherein said approximate detection of step b) comprises performing at least two detections that include at least a moment when said impact or bounce happens and/or at least a moment immediately before the impact or bounce and/or at least a moment immediately after the impact or bounce, using in said step c), as the time point for the automatic selection of said at least one image, at least one of the time points of said at least two detections.

6. The method according to claim 1, wherein said step d) comprises showing said at least one selected image on displaying means to allow performing the aforementioned analysis by visually judging the image, or to supplement said analysis.

7. The method according to claim 1, wherein:

said step c) comprises selecting a plurality of images, arranged in sequence, which include the image acquired for the same point in time as the approximate detection and images for points in time before and after that point; and said step d) comprises a video playback including said plurality of images, in slow motion forward and/or backwards and/or stopping in order to perform the aforementioned visual judgment.

8. The method according to claim 4, comprising performing said step a) the plurality of high speed cameras covering the various components of the playing field, or arranged on or proximate thereto, from different sides thereof, and/or the different sections of the perimeter lines from both sides and/or ends thereof and/or all the targets from different sides thereof.

9. The method according to claim 1, comprising using said predefinition of said approximate area where the bounce will occur to activate and/or control one or more high-speed cameras whose coverage area includes the approximate predefined area.

10. The method according to claim 1, comprising automatically discerning when the detected object is indeed a spherical element based on the difference in the detection signals caused by being detected by the detection and recognition system in comparison with the detection signals resulting from the detection of other elements, stationary or mobile, of at least different shape and size.

11. The method according to claim 1, wherein said spherical element is a tennis ball and said playing field is a tennis court, with said game areas being the different rectangular areas of said tennis court.

12. The method according to claim 4, wherein said at least one target is constituted by a sub-area of at least one of the game areas and is marked physically or virtually on the ground, projected on the ground or on displaying means visible to a player.

13. The method according to claim 12, comprising modifying the shape, size and/or position of said target, with reference to the playing field, and performing the steps a) to d) to detect whether or not the spherical element has bounced on the modified target.

14. The method according to claim 12, comprising, after said step d), selecting another target and performing the steps a) to d) to detect whether or not the spherical element has bounced on said another target.

15. The method according to claim 3, wherein said spherical element is a tennis ball and said playing field is a tennis court, with said game areas being the different rectangular areas of said tennis court and wherein the method comprises selecting as perimeter lines on which check when the tennis ball has really bounced or not, the following:
    those demarcating a respective service area to which a player will serve or has served, to judge whether the tennis ball bounces in or out of the service area; or
    those demarcating the total game area for a single or a doubles match during the rally after the service.

16. The method according to claim 15, comprising receiving information on whether, after the service, the tennis ball has touched a net or not of the playing field, and based on this information, after judging whether the tennis ball bounces in or out of the service area, the method comprises issuing a signal indicating that:
    the serve must be repeated, when the ball has bounced inside the service area but after touching the net, or
    the serve must not be repeated, when the ball has bounced outside the service area after touching the net.

17. A system for determining whether a spherical element impacts with a component of a playing field, or with a component arranged on said playing field or proximate to said playing field, said playing field being made up of game areas, comprising:
    means for acquiring and recording images including at least one high speed camera and memory to acquire and record a sequence of images of at least one surveillance area of said playing field that covers at least part of said component;
    means for detection to perform an approximate detection of an impact of a spherical element with said component or proximate thereto;
    means for automatic selection connected to said means of detection, with access to said recorded images in the memory, to automatically select, in response to said approximate detection, at least one image, of said sequence of images, acquired for the same point in time and which includes the area where said impact has been produced; and
    means for displaying and analysing including a screen for, respectively, displaying said at least one selected image, to allow it to be judged by visual analysis, and to analyse it automatically, to check when the spherical element has really impacted or not with said component;
wherein:
    said detection means comprise a three-dimensional type object detection and recognition system that can discern automatically when the object detected is indeed a spherical element, wherein said three-dimensional type object detection and recognition system comprises, in order to perform the aforementioned approximate detection:
    a first detection device arranged at ground level or proximate thereto, with its field of coverage including at least a portion of the component or of the perimeter line or of the target, on or near to which said impact or bounce occurs; and
    at least a second and a third detection devices located in two respective points at different heights, both higher than the first detection device, to detect the passage of a moving element through at least two points located at different heights, the detection and recognition system performing, based on the detection of the passage through said two points, a prediction of the trajectory to be followed by the moving element, and discerning whether or not it is a spherical element.

18. The system according to claim 17, wherein said three-dimensional type object detection and recognition system includes at least one three-dimensional scanner system, active or passive, including an active laser scanner system and an ultrasound device.

19. The system according to claim 17, wherein said means for acquiring and recording images comprise a plurality of high speed cameras arranged so that their coverage areas encompass the various components of the playing field, or arranged on or proximate thereto, from different sides of the components, and/or the different sections of the perimeter lines from both sides and/or ends thereof and/or all the targets from different sides thereof.

20. The system according to claim 19, wherein said high-speed cameras are arranged at ground level or substantially at ground level.

21. The system according to claim 19, wherein at least one of said high speed cameras, or another camera of the means for acquiring and recording images is mobile and wherein the system comprises a mobile robot carrying said at least one mobile camera, and which includes a supervision, tracking and prediction system that makes it aware of the circumstances of the game, including the position at all times of the players and of the spherical element, and that predicts, by calculating, where the spherical element is going to impact or bounce, making the robot suitable for, based on such knowledge and prediction, finding the best angle of capture of the mobile camera and moving in the direction of the area where the spherical element is expected to bounce.

22. The system according to claim 19, wherein said spherical element is a tennis ball and said playing field is a tennis court with said game areas being the different rectangular areas of said tennis court, wherein one or more cameras are arranged on either side of a centre net but at a distance therefrom, not adjacent to the centre net, wherein said centre net (N) has a translucent portion and wherein the one or more cameras are arranged so they have an angle of vision through said translucent portion of the centre net that allows capturing images that are behind the centre net.

* * * * *